(12) United States Patent
Weinmann et al.

(10) Patent No.: US 9,950,338 B2
(45) Date of Patent: Apr. 24, 2018

(54) SEALANT INJECTION SYSTEMS

(71) Applicant: The Boeing Company, Chicago, IL (US)

(72) Inventors: Jake Weinmann, Signal Hill, CA (US); John Walter Pringle, IV, Gardena, CA (US); Chris J. Erickson, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 32 days.

(21) Appl. No.: 14/792,540

(22) Filed: Jul. 6, 2015

(65) Prior Publication Data
US 2017/0008024 A1    Jan. 12, 2017

(51) Int. Cl.
| | |
|---|---|
| *B05C 7/00* | (2006.01) |
| *B05C 17/005* | (2006.01) |
| *B05B 15/04* | (2006.01) |
| *B05D 1/26* | (2006.01) |
| *B05B 13/04* | (2006.01) |
| *B05C 5/02* | (2006.01) |
| *B05C 7/06* | (2006.01) |
| *B05C 1/02* | (2006.01) |

(52) U.S. Cl.
CPC ............ *B05D 1/26* (2013.01); *B05B 13/0431* (2013.01); *B05B 15/0456* (2013.01); *B05C 5/0208* (2013.01); *B05C 7/06* (2013.01); *B05C 17/00503* (2013.01); *B05C 17/00516* (2013.01); *B05C 1/027* (2013.01); *B05C 5/0216* (2013.01); *B05C 5/0254* (2013.01)

(58) Field of Classification Search
None
See application file for complete search history.

(56) References Cited

U.S. PATENT DOCUMENTS

| | | | | | |
|---|---|---|---|---|---|
| 2,559,553 | A | * | 7/1951 | Lewis | E04F 21/30 401/172 |
| 3,536,411 | A | * | 10/1970 | Eisert | B43M 11/06 401/176 |

(Continued)

FOREIGN PATENT DOCUMENTS

| | | |
|---|---|---|
| DE | 951478 C | 10/1956 |
| DE | 202008003757 U1 | 9/2009 |

(Continued)

OTHER PUBLICATIONS

European Patent Office, Extended European Search Report in European Patent Application No. 16162094.3-1760, dated Aug. 10, 2016, 6 pages.

(Continued)

*Primary Examiner* — Binu Thomas
(74) *Attorney, Agent, or Firm* — Kolisch Hartwell, P.C.

(57) ABSTRACT

Sealant injection systems for injecting sealant into a cavity, the sealant injection systems including a sealant dispensing tip having a proximal end portion, a body portion, and a distal end portion that define a continuous channel to an aperture in the distal end portion for dispensing sealant material into a cavity, where the aperture is surrounded by a compressible material. The distal end portion may have a linear ridge defined on an end face, the aperture being asymmetrically provided relative to the ridge.

18 Claims, 7 Drawing Sheets

(56) References Cited

U.S. PATENT DOCUMENTS

| | | | |
|---|---|---|---|
| 4,101,077 A * | 7/1978 | Gibson | B05C 17/005 239/598 |
| 4,698,005 A * | 10/1987 | Kikuchi | B05C 17/00 118/206 |
| 4,778,642 A | 10/1988 | Lee et al. | |
| 4,964,362 A | 10/1990 | Dominguez | |
| 5,017,113 A * | 5/1991 | Heaton | B05C 17/00516 401/261 |
| 5,908,644 A | 6/1999 | Poole | |
| 6,001,181 A | 12/1999 | Bullen | |
| 6,179,506 B1 * | 1/2001 | Dewberry | B05C 17/00516 401/265 |
| 7,963,246 B1 | 6/2011 | Brinker | |
| 8,651,046 B1 | 2/2014 | Davancens et al. | |
| 9,016,530 B2 | 4/2015 | Topf et al. | |
| 2004/0149204 A1 * | 8/2004 | Park | B05C 17/00516 118/200 |
| 2008/0128430 A1 | 6/2008 | Kovach et al. | |
| 2013/0207348 A1 | 8/2013 | Smeets | |
| 2016/0279863 A1 | 9/2016 | Trend et al. | |
| 2016/0325304 A1 | 11/2016 | Pham et al. | |
| 2016/0325307 A1 | 11/2016 | Atsebha et al. | |

FOREIGN PATENT DOCUMENTS

| | | |
|---|---|---|
| EP | 0889108 A1 | 1/1999 |
| EP | 2837430 A2 | 2/2015 |
| GB | 2524508 A | 9/2015 |
| WO | 0226397 A1 | 4/2002 |
| WO | 2012084238 A1 | 6/2012 |
| WO | 2014063806 A1 | 5/2014 |
| WO | 2014179015 A1 | 11/2014 |

OTHER PUBLICATIONS

U.K. Intellectual Property Office, Combined Search and Examination Report under Sections 17 and 18(3) in UK Patent Application No. GB1609279.3, dated Nov. 10, 2016, 6 pages.

* cited by examiner

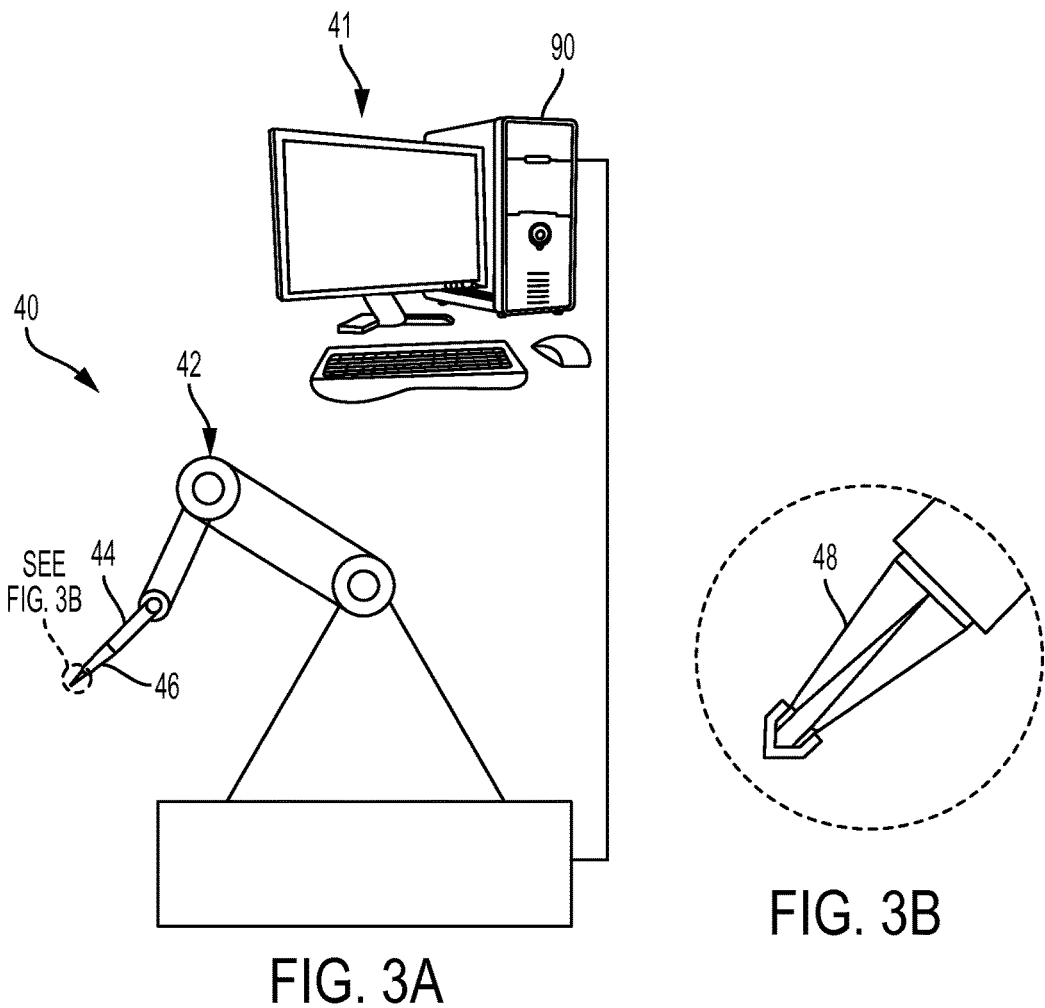
FIG. 3A
FIG. 3B
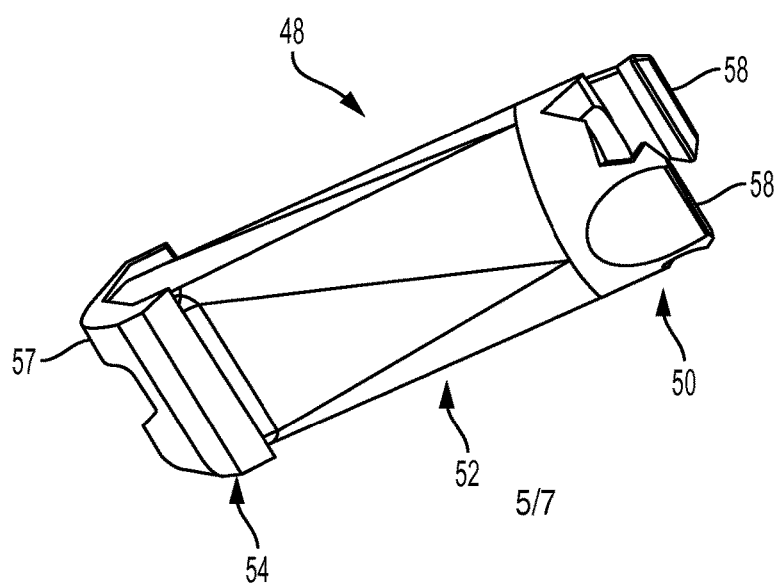
FIG. 4

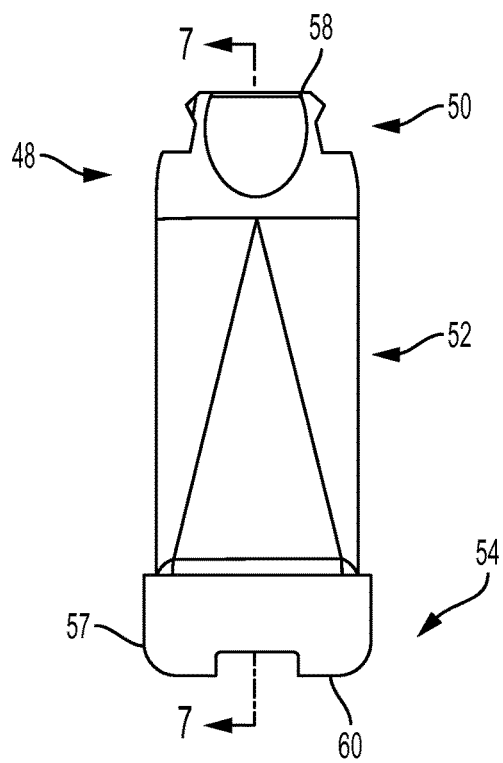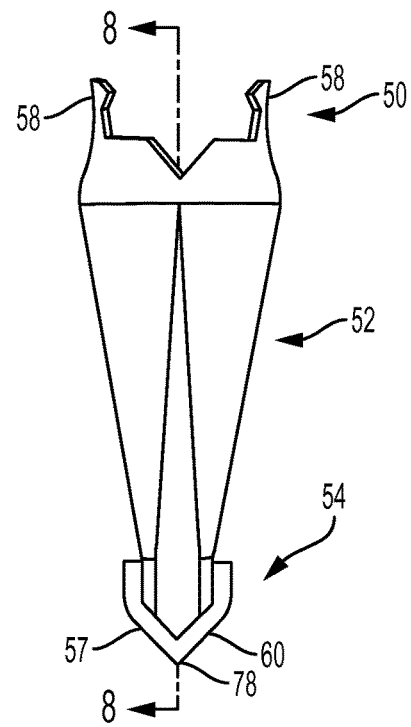
FIG. 5        FIG. 6
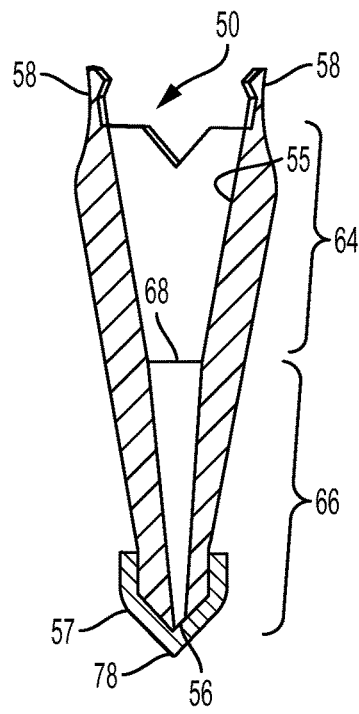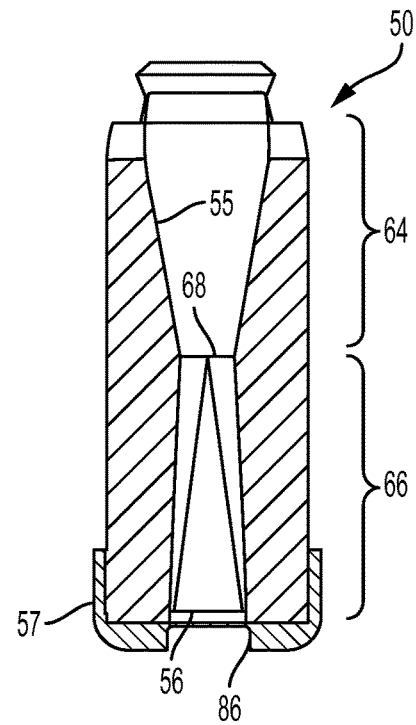
FIG. 7        FIG. 8

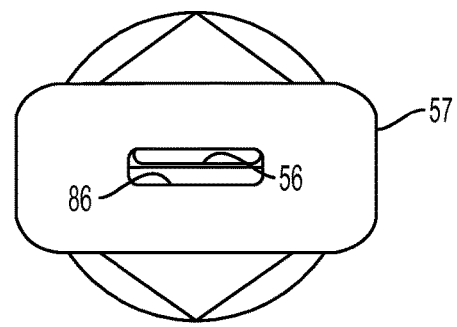
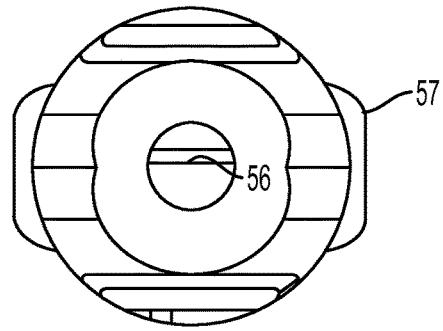
FIG. 10　　　　FIG. 11
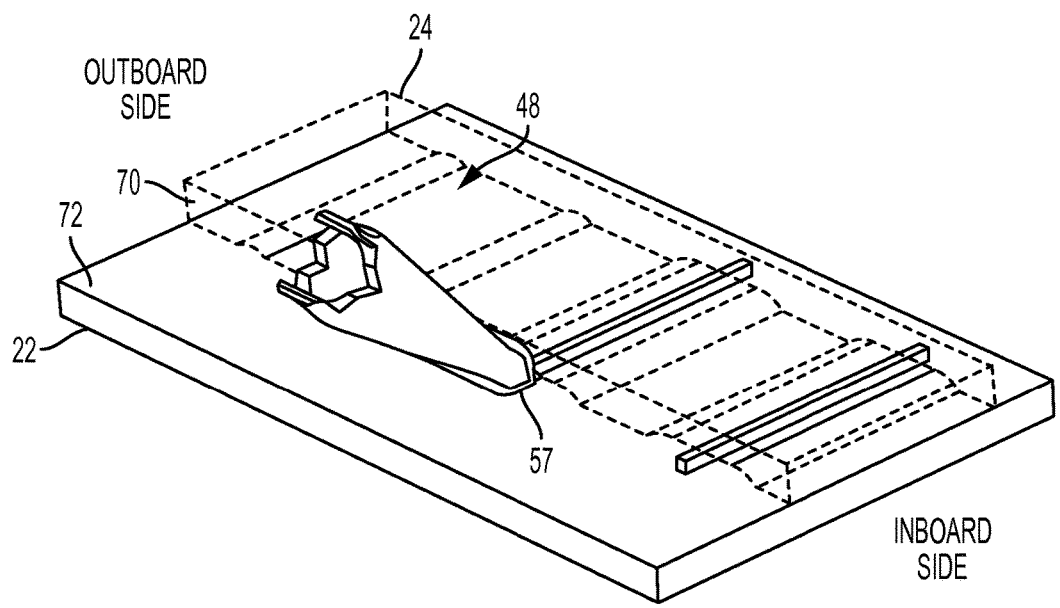
FIG. 12

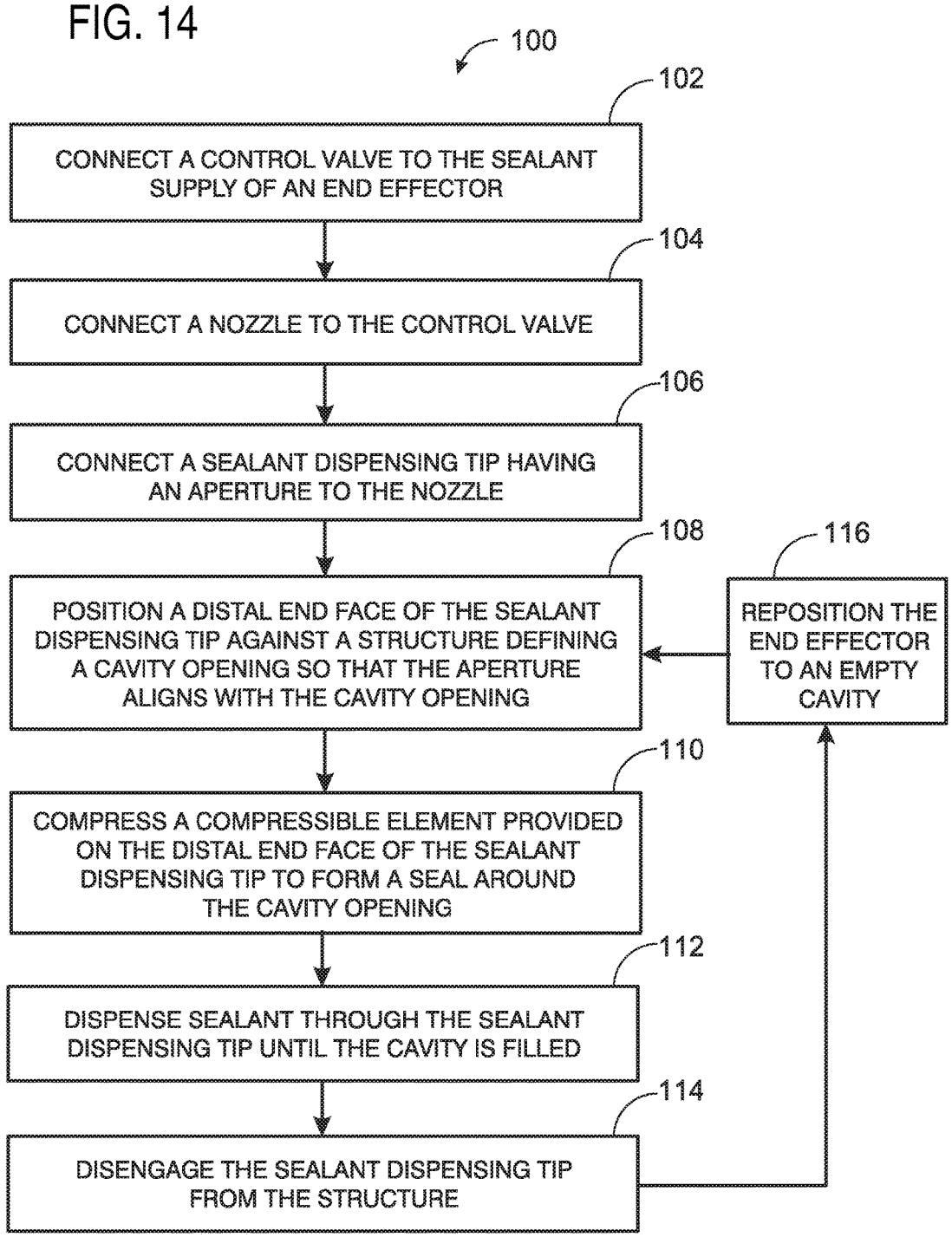

SEALANT INJECTION SYSTEMS

FIELD

This disclosure relates to sealant injection systems and methods for dispensing sealant into a cavity.

INTRODUCTION

Many types of manufacturing require small voids and channels to be filled by a sealant composition. In many such instances, sealant may be applied manually in order to ensure the complete filling of the void, to perform any necessary reshaping and smoothing of the sealant, and to ensure that any sealant applied in excess or to an undesired area is satisfactorily removed. Such manual operations are tedious, time-consuming, may consume an undesirably large amount of skilled labor, and may generate an undesirable amount of waste.

Although the use of automated manufacturing has proven economical in a variety of industrial applications, the use of existing tooling for automated sealant delivery may lead to unsatisfactory results.

What is needed is a sealant injection system that is well-suited for automated manufacturing methods, and that can fill cavities rapidly and with a precise amount of sealant so that post-dispensing clean-up is minimized.

SUMMARY

The present disclosure provides sealant dispensing tips, sealant injection systems, and methods of injecting sealant into a cavity.

In some aspects, the present disclosure provides a sealant dispensing tip that includes a proximal end portion, a body portion connected to the proximal end portion, and a distal end portion connected to the body portion. The proximal end portion of the sealant dispensing tip is configured to engage a sealant material dispensing system, and the sealant dispensing tip includes a continuous channel that is defined by and through the proximal end portion, body portion, and distal end portion to an aperture provided in the distal end portion for dispensing sealant material into a cavity. The distal end portion further includes a compressible material surrounding the aperture.

In some aspects, the present disclosure provides a sealant injection system that includes a robot having an end effector, a nozzle connected to the end effector, and a disposable tip mounted on the nozzle. The end effector is configured to move a sealant dispenser and to control a flow of sealant to a desired location. The tip has a central channel, an aperture in an end face, and a compressible member adhered to the end face surrounding the aperture.

In some aspects, the present disclosure provides a method of injecting sealant into a cavity, the method including compressing a compressible element provided on a distal end face of a nozzle tip against a structure defining an opening to the cavity, and channeling sealant through the nozzle and tip into the cavity.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIGS. 3A and 3B are diagrammatic and illustrative representations of an automatic sealant injection system according to the present disclosure.

FIG. 4 is a diagrammatic representation of an exemplary sealant nozzle tip according to the present disclosure.

FIG. 5 is a front view of the exemplary sealant nozzle tip of FIG. 4.

FIG. 6 is a side view of the exemplary sealant nozzle tip of FIG. 4.

FIG. 7 is a cross-sectional view of the exemplary sealant nozzle tip as indicated in FIG. 5.

FIG. 8 is a cross-sectional view of the exemplary sealant nozzle tip as indicated in FIG. 6.

FIG. 10 is a bottom view of the exemplary sealant nozzle tip.

FIG. 11 is a top view of the exemplary sealant nozzle tip.

FIG. 12 is a diagrammatic representation of a stringer attached to a wing panel of an aircraft, showing the positioning of the exemplary sealant nozzle tip at an opening of a cavity.

FIG. 14 is a flowchart depicting an alternative illustrative method of injecting sealant into a cavity.

DESCRIPTION

Overview

Various embodiments of sealant dispensing tips, sealant injection systems, and methods of injecting sealant into a cavity are described below and illustrated in the associated drawings. Unless otherwise specified, the sealant injection systems of the present disclosure and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar sealant injection systems. The advantages possessed or exhibited by selected aspects, as described below, are illustrative in nature. The following description of various aspects is exemplary in nature and is in no way intended to limit the disclosure, its application, or uses.

The sealant dispensing tips, sealant injection systems, and methods of injecting sealant into a cavity described herein may possess particular utility for filling cavities with sealant, particularly but not exclusively cavities that may be longitudinal cavities, or channels, having an opening at each end of the cavity. The disclosed sealant dispensing tips may permit the formation of a seal between the dispensing tip and the opening to the longitudinal cavity that is sufficiently robust to permit the injection of sealant into the cavity with adequate pressure that sealant fills the entire cavity without compromising the seal.

While the sealant injection systems, sealant dispensing tips, and methods of injecting sealant of the present disclosure may be described in the context of aircraft manufacture, it should be appreciated that various embodiments of the disclosed systems and methods may and likely will possess enhanced utility in any manufacturing process that requires the injection of a sealant into a cavity, and so should not be considered limited to aircraft manufacture.

Figure 1:
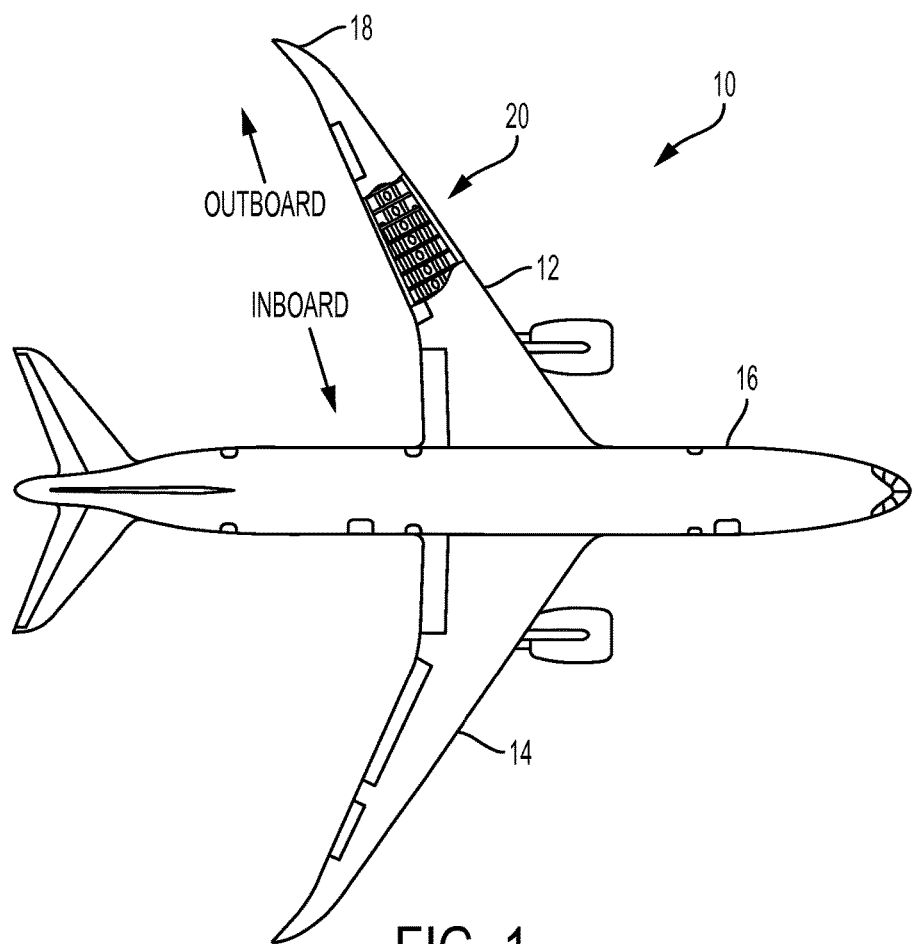
FIG. 1 is a diagrammatic and illustrative representation of an aircraft, including a cutaway portion depicting a representation of internal wing structure.
Figure 2:
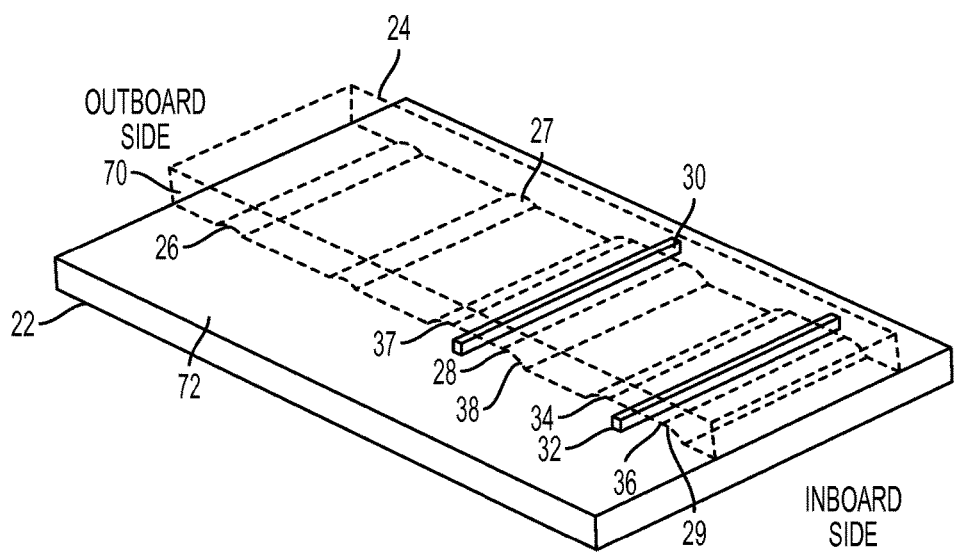
FIG. 2 is a diagrammatic representation of a stringer attached to a wing panel of an aircraft.

FIGS. 1 and 2 shown an example of a cavity structure on an aircraft which may require sealing and/or filling. FIG. 1 depicts an aircraft 10 as viewed from above, including wings 12, 14, and fuselage 16. Wing 12 includes a cutaway portion 20 that reveals a schematic depiction of the internal structure of the wing, incorporating spars running spanwise along the wing, and ribs running across the wing between adjacent spars. Structural strength may be added to the skin of the wing by incorporating one or more stringers, which may run longitudinally along the wing.

A portion of a lower wing panel 22 with an attached stringer segment 24 is depicted schematically in FIG. 2. Stringer 24 has a conformation such that when stringer 24 is attached to wing panel 22, channels 26, 27, 28, and 29 are formed between stringer 24 and wing panel 22. The sealant dispensing tips, sealant injection systems, and methods of injecting sealant into a cavity of the present disclosure may be well-suited to filling one or more of channels 26, 27, 28, and 29 with a chosen sealant formulation.

The sealant dispensing tips, sealant injection systems, and methods of injecting sealant into a cavity described herein may be similarly applied and/or adapted to seal or fill many other structures on aircraft and other manufactured products.

EXAMPLES, COMPONENTS, AND ALTERNATIVES

The following sections describe selected aspects of exemplary sealant injection systems, sealant dispensing tips, and methods of injecting sealant as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

This example describes an illustrative sealant injection system 40 according to an embodiment of the present disclosure, as shown in FIGS. 3A and 3B.

Sealant injection system 40 may be coupled to, and operated by, a computer 41. Sealant injection system 40 may include an industrial robotic arm assembly 42 that may be further coupled to an end effector 44. End effector 44 may be configured to interact with the environment, and may serve as an attachment point for one or more tools. In particular, end effector 44 may be configured to interact with a workpiece that is undergoing part of a manufacturing process. End effector 44 may be configured to include a supply of sealant and a sealant flow control system. Where End effector 44 includes a sealant flow control system, End effector 44 may in turn be coupled to a nozzle 46. Selected examples of end effectors suitable for use in sealant injection systems are described in U.S. Pat. No. 8,651,046 to Davancens et al. Selected examples of control valves incorporating valve bodies suitable for use in sealant injection systems are described in U.S. Pat. No. 9,016,530 to Topf et al.

As shown in the enlarged view of FIG. 3B, nozzle 46 of sealant injection system 40 may be coupled to a sealant dispensing tip 48, which may also be identified as a nozzle tip. As shown in greater detail in FIGS. 4-8, sealant dispensing tip 48 may include a proximal end portion 50 that is configured to engage the sealant material dispensing system 40, a body portion 52 that is connected to the proximal end portion 50, and a distal end portion 54 that is connected to the body portion 52. As shown in FIGS. 7 and 8, a continuous channel 55 may be defined through proximal end portion 50, body portion 52, and distal end portion 54 to an aperture 56 defined in the distal end portion 54, where aperture 56 is configured for dispensing sealant material into a cavity. A compressible material 57 may be attached to the distal end portion 54 so that compressible material 57 surrounds aperture 56.

Proximal end portion 50 of sealant dispensing tip 48 may be configured to releasably engage nozzle 46 of sealant injection system 40. Any engagement mechanism capable of releasably securing sealant dispensing tip 48 to nozzle 46 is an appropriate engagement mechanism for the purposes of this disclosure. The engagement mechanism may be selected so that sealant dispensing tip 48 can be engaged to sealant injection system 40 and subsequently disengaged from sealant injection system 40. The engagement mechanism may be selected so that such engagement and disengagement can be accomplished quickly and easily. In addition, the engaging mechanism may be selected so that the interface between sealant dispensing tip 48 and nozzle 46 is robust and so that sealant does not leak from the interface.

Proximal end portion 50 of sealant dispensing tip 48 may be configured so that the sealant dispensing tip 48 may be easily engaged and disengaged from nozzle 46 manually, that is by hand. Alternatively or in addition, the sealant dispensing tip 48 may be configured so that it may be easily engaged and disengaged from nozzle 46 automatically, for example robotically. The sealant injection system 40 may include a mechanism configured to coordinate with robotic arm assembly 42 so that sealant dispensing tip 48 may be automatically replaced with an identical or differing sealant dispensing tip. The sealant injection system may include an array of such dispensing tips suited for various applications, and be configured so that the dispensing tips can be rapidly selected and exchanged without manual intervention.

In one embodiment of the present disclosure, the proximal end portion 50 of sealant dispensing tip 48 may be configured to cooperate with an engagement mechanism configured to secure the sealant dispensing tip 48 to the distal portion of nozzle 46 during operation. The engagement mechanism may include a threaded engagement mechanism, a cam and groove engagement mechanism, a locking cam engagement mechanism, a resilient snap-on engagement mechanism, or other such engagement mechanism. In particular, the proximal end portion 50 may include one or more resilient projections 58 that may be configured to engage corresponding and complementary structures on distal portion of nozzle 46. The sealant dispensing tip 48 may be configured to be manually urged into engagement with nozzle 46, with projections 58 flexing under such urging, and then snapping securely into place, retaining sealant dispensing tip 48 in engagement with nozzle 46 of the sealant injection system 40.

The distal end portion 54 of sealant dispensing tip 48 may include an end face 60 surrounding and defining distal aperture 56 that is configured to dispense a sealant material into a target cavity. The sealant dispensing tip 48 may be configured so that a continuous internal channel 55 is defined by and through the proximal end portion 50, body portion 52, and distal end portion 54, the continuous internal channel 55 being configured to form a fluid connection between nozzle 46 and distal aperture 56.

The internal channel 55 may be shaped so that at the proximal end 50 of the sealant dispensing tip 48 the channel cross-section matches the cross-section of an outlet of nozzle 46. At the distal end 54 of the sealant dispensing tip 48 the channel may terminate at distal aperture 56. Internal channel 55 may have a profile that varies along its length so as to minimize pressure build-up when sealant is urged through the profile. For example, the cross-sectional profile of internal channel 55 may change shape from its proximal end to its distal end in such a way as to avoid discontinuities or irregularities in the channel or along the channel walls that might compromise the flow of sealant. The internal channel 55 may change shape continuously and smoothly along the length of the internal channel. Alternatively, the internal channel may change shape in two or more discrete regions.

For example, and as shown in FIGS. 7 and 8, the internal channel 55 of sealant dispensing tip 48 may change shape in two regions 64 and 66. The first region 64 defines a substantially conical channel region that smoothly decreases in cross-sectional diameter from the proximal end 50 of sealant dispensing tip 48 to a transition point 68, while the second region 66 defines a region that smoothly transitions from a circular cross-section at the transition point 68 to a cross-section matching that of aperture 56 at the distal end portion 54 of the sealant dispensing tip 48.

Distal end portion 54 of the sealant dispensing tip 48 may be configured to form a cooperative seal with a surface that surrounds and defines an opening that is in fluid communication with the cavity to be filled with sealant. For example, end face 60 of distal end portion 54 may incorporate one or more planar surfaces sized and disposed appropriately to form such a cooperative seal.

More specifically, in considering channels 26, 27, 28, and 29 between stringer 24 and wing panel 22 of FIG. 2, the distal end portion 54 of sealant dispensing tip 48 may be shaped so as to form a seal simultaneously against vertical side surface 70 of stringer 24 and horizontal upper surface 72 of wing panel 22. An appropriate configuration for end face 60 of sealant dispensing tip 48 may include two planar surfaces 74 and 76, where planar surface 74 is configured to be pressed against vertical side surface 70, and planar surface 76 is configured to be pressed against horizontal surface 72, as shown in FIG. 9.

Planar surfaces 74 and 76 may meet at an angle of approximately 90 degrees in order to be complementary to the geometry of the surfaces surrounding and defining channels 26, 27, 28, and 29. Intersecting planar surfaces 74 and 76 may form a linear ridge 78 on end face 60 (as shown in FIGS. 6 and 7) that is configured to be urged into the corner 79 defined by vertical surface 70 and horizontal surface 72 (as shown in FIGS. 9B and 9C).

It should be appreciated that the number, size, and relative orientations of the planar surfaces of end face 60 may be varied in order to accommodate the geometry surrounding the particular cavity to be filled with sealant. For example, end face 60 may include two or more planar surfaces that form an angle that is an acute angle, an obtuse angle, or an approximate right angle in order to accommodate the corresponding geometry around the cavity to be filled. In one aspect of the present disclosure, end face 60 may include two planar surface that form an angle therebetween of between about 80 to about 100 degrees.

Figure 9A:
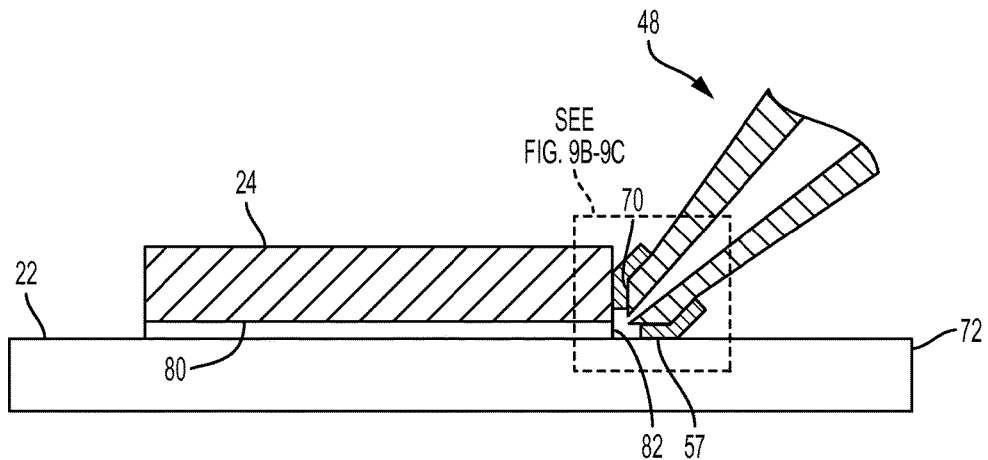
FIGS. 9A-9C depict diagrammatic cross-sectional views of the exemplary sealant nozzle tip attached to a wing panel, showing the positioning of the exemplary sealant nozzle tip at an opening of a cavity.
Figure 9B:
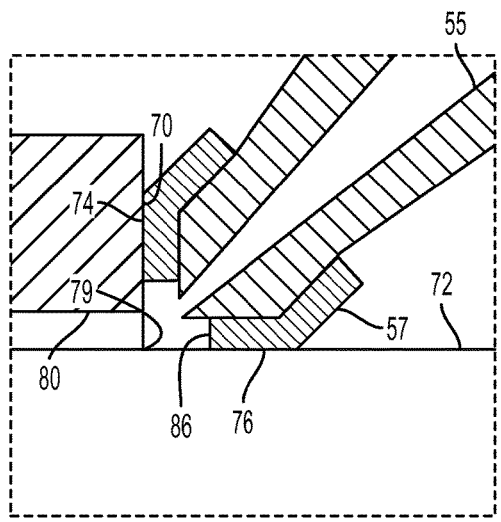
Figure 9C:
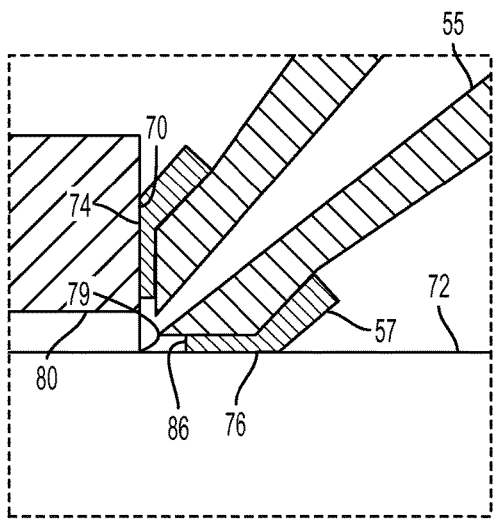

FIGS. 9A-9C depict an illustrative placement of sealant dispensing tip 48 so as to facilitate the filling of a cavity with sealant. The cavity to be filled with sealant corresponds to a channel 80 formed in stringer 24, which is open at each end of the channel. The injection of sealant into channel 80 may be facilitated by channel 80 being open at the end opposite the injection site. Opening 82 to channel 80 is defined in vertical face 70.

Correspondingly, distal aperture 56 may be defined in planar surface 74 of end face 60, and distal aperture 56 may not extend onto planar surface 76. In this way distal aperture 56 may be more closely aligned with opening 82 of channel 80.

As shown in FIGS. 10 and 11, aperture 56 is defined by planar surface 74, and so aperture 56 may be considered to be off-center with respect to the centerline of end face 60, which in this example is coincident with linear ridge 78. Aperture 56 may have any profile suitable for forming a seal against opening 82 to channel 80. For example, aperture 56 may be smaller than opening 82. That is, that each of the width and height of aperture 56 may be less than the corresponding width and height of opening 82. As shown in FIGS. 10 and 11, aperture 56 may be rounded and elongate, and the axis of elongation of aperture 56 may be configured so that it is substantially parallel to surface 72 when channel 80 is being filled with sealant. In one aspect of the present disclosure, distal aperture 56 is rounded and elongate, and the width of aperture 56 along its long axis is about ¼ inch (6.4 mm) long.

Compressible material 57 applied to end face 60 of sealant dispensing tip 48 may help to form an enhanced seal between end face 60 of sealant dispensing tip 48 and opening 82 of channel 80. Compressible material 57 may include an opening 86 present in and defined by compressible material 57 that is centered on distal aperture 56, and that is larger than distal aperture 56. Opening 86 may be either smaller than or larger than the opening 82, provided that a suitable seal between end face 50 and opening 82 of channel 80 can be established and maintained. In one aspect of the present disclosure, opening 86 may be smaller than opening 82 to channel 80. That is, opening 86 in the compressible material 57 of end face 60 may be smaller than opening 82 to channel 80, while at the same time opening 86 may be larger than distal aperture 56 in distal end portion 54 of sealant dispensing tip 48.

The sizes of distal aperture 56 and opening 86 in the compressible material 57 of end face 60 may be selected so that they are suitable for filling very small orifices. However, the utility of disclosed sealant dispensing tip 48 for larger cavities is not diminished, and a sealant injection system employing sealant dispensing tip 48 can be used to fill larger channels or cavities without the necessity of exchanging the dispensing tip for an alternative tip having a larger distal aperture.

End face 60 of sealant dispensing tip 48 may be configured so that end face 60 may be placed in contact with a corner 79 formed by side surface 74 and horizontal surface 72, as shown in FIGS. 9A and 9B. Further urging of sealant dispensing tip 48 into corner 79 may result in a compression of compressible material 57, as shown in FIG. 9C. This compression may help form a temporary seal between distal end portion 54 of sealant dispensing tip 48 and the surfaces surrounding opening 82, as shown in FIG. 9C. Sealing the dispensing tip around the cavity opening with sufficient force may permit rapid and efficient transfer of sealant from the tip into the cavity. Additionally, the location of distal aperture 56 may be selected so that compression of compressible material 57 results in an enhanced alignment between distal aperture 56 and cavity opening 82.

Alternatively, or in addition, the presence of compressible material 57 may permit the formation of a temporary seal between distal end portion 54 and the workpiece even when a robotic sealant injection system may slightly misalign sealant dispensing tip 48 when urging it against the workpiece, providing an increased degree of tolerance during automated processes.

Where side surface 74 and horizontal surface 72 meet at approximately right angles, end face 60 is configured to possess an approximately 90 degree edge so as to form a satisfactory seal against surfaces 74 and 72. In some aspects of the present disclosure, forming a seal between sealant dispensing tip 48 and surfaces 72 and 74 may necessitate that nozzle 46 and end effector 44 of sealant injection system 40 be oriented at an angle of approximately 45 degrees with respect to surface 72 of wing panel 22. Such a disposition of end effector 44 may be advantageous where the size and orientation of end effector 44, as well as robotic arm 42, may limit the permitted angle of approach of sealant dispensing tip 48 to the workpiece.

Any material that is sufficiently resilient and compressible to create a temporary seal between distal end portion 54 and the surfaces surrounding opening 82 is an appropriate material for the purposes of the present disclosure. In one aspect, compressible material 57 is a foam, such as a natural gum foam. The natural gum foam may be adhesive-backed in order to facilitate attachment of compressible material 57 to end face 60 of sealant dispensing tip 48, however any suitable adhesive composition may be applied to one or both of the compressible material and end face 60 to secure compressible material 57 in place. In a preferred embodiment, an acrylic adhesive is suitable for adhering the compressible material to the distal end portion 54.

Compressible material 57 may be selected so that a suitable compressive force applied by the robotic arm assembly 42 will produce an adequate seal between the compressible material 57 and the surface surrounding the opening to the cavity to be filled with sealant. An adequate seal may be, but is not required to be, a hermetic or air-tight seal. A seal between the compressible material 57 and the cavity opening is opening is adequate when the seal resists the leaking of sealant under an applied pressure sufficient to inject sealant into the cavity.

The compressible material 57 may be selected so that a compressive force of about 1-20 psi (about 7-138 kPa), 2-15 psi (14-103 kPa) or 5-9 psi (about 34-62 kPa) results in an indentation force deflection of at least about 25%. Compressible material 57 may further be selected so that the density of the compressible material is about 10-40 lbs/ft$^3$ (about 160-640 kg/m$^3$) 15-35 lbs/ft$^3$ (about 240-560 or 23-29 lbs/ft$^3$ (about 368-464 kg/m$^3$). Compressible material 57 may be applied across the width of end face 60, or compressible material 57 may extend beyond the edge of end face 60, as shown in FIGS. 4-9, provided that compressible material 57 extends sufficiently to provide a satisfactory seal between distal end face 60 and the surfaces surrounding opening 82. Compressible material 57 may be selected to have a thickness of about 1/64 inch (0.4 mm) to about 1/8 inch (3.2 mm), or about 1/32 inch (0.8 mm) to about 1/16 inch (1.6 mm). An illustrative, but not exclusive, example of an appropriate composition for use as a compressible material 57 is an adhesive-backed natural gum foam available from MCMASTER-CARR (catalog no. 93625K434). Other types of compressible foam materials such as polyurethane or polyethylene may also be used for some applications.

The sealant injection systems of the present disclosure may have utility for injecting any of a variety of viscous fluids or semi-solid compositions into a variety of cavities and/or channels, in a variety of industrial settings. The term sealant is used to refer to any such composition suitable for substantially filling such cavities and/or channels using the disclosed sealant injection systems. Such sealant compositions may be adhesive or non-adhesive, and may or may not be subject to curing. Any sealant composition having a suitable viscosity under the desired application conditions that the sealant injection system can force the sealant composition throughout the channel or cavity is an appropriate sealant composition, particularly where the channel is not sealed but is open at the end remote from the injection site.

In one aspect of the disclosure, the sealant composition may be selected to have sufficiently adhesive properties to provide effective sealing, for example to completely fill and thereby plug a channel. The sealant composition may be selected to undergo curing, either via the addition of an activating compound or catalyst, by the passage of time, or other mechanism. A variety of suitable sealant compositions are commercially available, including plastic sealants, rubber sealants, and varnishes, among many others.

In one embodiment of the present disclosure, the sealant composition may be a polysulfide-based synthetic rubber sealant, such as for example fast-curing BMS 5-45 polysulfide sealant.

Example 2

This example describes an illustrative control system for a sealant injection system 40, as described in Example 1.

Sealant injection system 40 may be coupled to, and operated by, a computer 41, including a processor 90. Processor 90 may include software corresponding to a user interface, where the user interface permits an operator to program sealant injection system 40 to execute the desired sequence of movements and operations required to dispense a sealant composition as described in the present disclosure. The user interface may accept inputs such as the dimensions of the work piece, the viscosity of the sealant to be used, the inner diameter of the dispenser tip, the length of the dispenser tip, the geometry of the distal end portion of the dispenser tip, and the degree of compressibility of compressible material 57 disposed at end face 60 of distal end portion 54 of sealant dispensing tip 48, among others. The user interface may be configured so that the parameters for the dispensation or injection of sealant is specified by the operator. Alternatively, the user interface may permit an operator to simply input a series of defining parameters, such as for example the dimensions of the workpiece, including the coordinates of each cavity to be filled with sealant, as inputs, and the user interface then creates an appropriate sealant dispensing pattern to satisfactorily fill each cavity of the workpiece.

Various aspects of the user interface, as well as the operating software to control the robotic assembly, may be embodied as a computer method, computer system, or computer program product. Accordingly, aspects of the present disclosure may take the form of an entirely hardware embodiment, an entirely software embodiment (including firmware, resident software, micro-code, and the like), or an embodiment combining software and hardware aspects, all of which may generally be referred to herein as a "module," or "system." Furthermore, aspects of the present disclosure may take the form of a computer program product embodied in a computer-readable medium (or media) having computer readable program code/instructions embodied thereon.

Instructions for an operating system, applications, and/or programs may be located in one or more storage devices in communication with the one or more processor units through the communications framework. The instructions may be in a functional form on a persistent storage. These instructions may be loaded into a memory for execution by processor 90.

These instructions may be referred to as program instructions, program code, computer usable program code, or computer readable program code that may be read and executed by processor 90. The program code in the different embodiments may be embodied on different physical or computer-readable media.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these. Computer program code for carrying out operations for aspects of the present disclosure may be written in any appropriate programming language. The program code may be written in a programming language intended for the robotic system being controlled, such as for example the TPP and KAREL programming languages that are useful for FANUC robotic systems. Alternatively or in addition, the program code may include any of a variety of programming languages, including object-oriented programming languages (such as Java, Smalltalk, C++, and/or the like), or conventional procedural programming languages (such as the C programming language, among others). The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

The computer program code or instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of the present disclosure. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

Example 3

Figure 13:
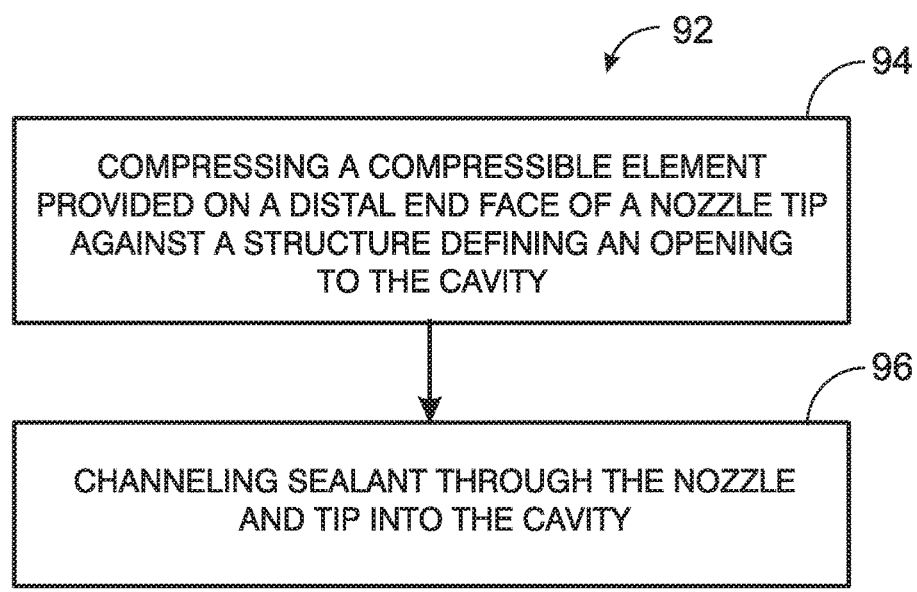
FIG. 13 is a flowchart depicting an illustrative method of injecting sealant into a cavity.

An illustrative method of injecting sealant into a cavity is depicted by flowchart 92 of FIG. 13. As depicted, the illustrative method includes compressing a compressible element provided on a distal end face of a nozzle tip against a structure defining an opening to the cavity (at 94 of flowchart 92), and channeling sealant through the nozzle and tip into the cavity (at 96 of flowchart 92).

Example 4

An illustrative automated method of injecting sealant into multiple cavities is depicted by flowchart 100 of FIG. 14. As depicted, the illustrative method includes connecting a control valve to the sealant supply of an end effector (at 102 of flowchart 100), connecting a nozzle to the control valve (at 104 of flowchart 100), connecting a sealant dispensing tip having an aperture to the nozzle (at 106 of flowchart 100), positioning a distal end face of the sealant dispensing tip against a structure defining a cavity opening so that the aperture aligns with the cavity opening (at 108 of flowchart 100), compressing a compressible element provided on the distal end face of the sealant dispensing tip to form a seal around the cavity opening (at 110 of flowchart 100), dispensing sealant through the sealant dispensing tip until the cavity is filled (at 112 of flowchart 100), disengaging the sealant dispensing tip from the structure (at 114 of flowchart 100), and then, if channels remain to be sealed, repositioning the end effector to an empty cavity (at 116 of flowchart 100) and positioning the distal end face of the sealant dispensing tip against another structure defining a cavity opening so that the aperture aligns with the cavity opening (at 108 of flowchart 100).

Example 5

This section describes additional aspects and features of the sealant dispensing tips, sealant injection systems, and methods of injecting sealant into a cavity, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. A sealant dispensing tip, comprising
a proximal end portion configured to engage a sealant material dispensing system,
a body portion connected to the proximal end portion,
a distal end portion connected to the body portion, a continuous channel being defined through the proximal end portion, body portion, and distal end portion to an aperture provided in the distal end portion for dispensing sealant material into a cavity, and a compressible material surrounding the aperture.

A1. The sealant dispensing tip of paragraph A0, wherein the distal end portion has an end face surrounding the aperture, the end face having a linear ridge formed by intersecting planar surfaces.

A2. The sealant dispensing tip of any one of the above paragraphs, a sectional plane being defined to bisect an upper portion of the channel and to contain the linear ridge, the aperture being located at least mostly on one side of the sectional plane.

A3. The sealant dispensing tip of any one of the above paragraphs, wherein the planar surfaces form an angle of 80 to 100 degrees.

A4. The sealant dispensing tip of any one of the above paragraphs, wherein the compressible material is adhered to a face of the distal end portion surrounding the aperture.

A5. The sealant dispensing tip of any one of the above paragraphs, wherein the compressible material has an opening permitting flow of sealant out of the aperture of the distal end portion into a cavity.

A6. The sealant dispensing tip of any one of the above paragraphs, wherein the cavity to be filled with sealant has an opening, the aperture in the distal end portion being smaller than the opening to the cavity.

A7. The sealant dispensing tip of any one of the above paragraphs, wherein the opening in the compressible material is smaller than the opening to the cavity and larger than the aperture in the distal end portion.

A8. The sealant dispensing tip of any one of the above paragraphs, wherein the compressible material is configured to create a temporary seal around the channel between the distal end portion and a structure adjacent the opening of the cavity.

A9. The sealant dispensing tip of any one of the above paragraphs, wherein the channel has a progressively and smoothly varying cross-sectional shape that is circular at the proximal end portion and elongate at the distal end portion.

A10. The sealant dispensing tip of any one of the above paragraphs, wherein the aperture of the distal end portion is elongate.

A11. The sealant dispensing tip of any one of the above paragraphs, wherein the compressible material has an indentation force deflection of at least about 25% under a compressive force of 5-9 psi (30-60 kPa).

B0. A sealant injection system, comprising
a robot having an end effector that is configured to move a sealant dispenser and to control a flow of sealant to a desired location,
a nozzle connected to the end effector, and
a tip mounted on the nozzle, the tip having a central channel, an aperture in an end face, and a compressible member adhered to the end face surrounding the aperture.

B1. The sealant injection system of paragraph B0, wherein the compressible member has an opening exposing the aperture in the end face.

B2. The sealant injection system of any one of the above paragraphs, wherein the opening in the compressible member is elongate having a long axis and a short axis, the aperture being symmetrically located relative to the short axis and nonsymmetrically located relative to the long axis.

B3. The sealant injection system of any one of the above paragraphs, wherein the opening in the compressible member is larger than the aperture in the end face and smaller than a second opening that is in fluid communication with a cavity to be sealed.

B4. The sealant injection system of any one of the above paragraphs, wherein the robot is configured to position the tip against a surface, and to apply a force on the surface at the tip of at least approximately 5 psi (30 kPa) prior to initiating the flow of sealant through the aperture in the end face.

B5. The sealant injection system of any one of the above paragraphs, wherein the robot is configured to position the tip against a surface, and to apply a force with the tip against the surface sufficient to compress the compressible member by at least 25% of its uncompressed thickness.

B6. The sealant injection system of any one of the above paragraphs, wherein the end face of the tip has a linear ridge formed by intersecting planar faces.

B7. The sealant injection system of any one of the above paragraphs, wherein the aperture is located mostly to one side of the ridge.

B8. The sealant injection system of any one of the above paragraphs, wherein the aperture is isolated on one side of the ridge.

C0. A method of injecting sealant into a cavity, comprising
compressing a compressible element provided on a distal end face of a nozzle tip against a structure adjacent an opening to the cavity, and
channeling sealant through the nozzle and tip into the cavity.

C1. The method of paragraph C0, wherein the channeling step includes directing the sealant into the cavity opening, where the structure defining the cavity opening is a first wall oriented orthogonally to an adjacent wall.

C2. The method of any one of the above paragraphs, wherein the channeling step includes directing the sealant into the cavity opening without directing sealant into the adjacent wall.

C3. The method of any one of the above paragraphs, wherein the compressing step is carried out prior to the channeling step.

C4. The method of any one of the above paragraphs, wherein the compressing step includes compressing the compressible element provided on the distal end face of the nozzle against the corner structure defined by the first wall and the adjacent wall.

C5. The method of any one of the above paragraphs, wherein the compressible element has a first and a second planar portions oriented orthogonally to one another, and the compressing step includes applying substantially equivalent force on each planar portion of the compressible element.

C6. The method of any one of the above paragraphs, wherein the compressible element has first and second planar portions oriented orthogonally to each other, and the compressing step resulting in approximately the same degree of compression for the first and second planar portions of the compressible element.

ADVANTAGES, FEATURES, BENEFITS

The different embodiments of the sealant dispensing tip, sealant injection system, and method of injecting sealant described herein provide several advantages over known solutions for the automated injection of adhesive or sealant into cavities or channels having small volumes.

The current manual process of dispensing sealant employed a pneumatic Semco gun to fill injection seals. However, due to the lack of pressure control, and lack of precision, the manual process resulted in the injection of excess sealant, which was then forced out of the cavity and onto the workpiece. The excess sealant dispensed in this way necessitated a significant amount of additional clean up, increasing man-hours needed to complete the process as well as generating additional waste materials that required appropriate disposal.

The sealant dispensing tip of the present disclosure includes an asymmetric dispensing aperture, which delivers sealant precisely to the opening of the cavity to be filled, while the presence of a compressible material on the planar faces of the end of the dispensing tip allows for the easy creation of a tight seal between the dispensing tip and the surface surrounding the opening to the cavity. This reliable and consistent seal permits enhanced control of sealant pressure and the volume of sealant that is dispensed, which in turn minimizes the injection of excess sealant onto the workpiece, and the need for additional cleaning after the injection process is complete.

No known system or device can perform these functions, particularly in the automated dispensing of sealant. However, not all embodiments described herein may provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A sealant dispensing tip for dispensing a sealant material into a cavity, comprising
   a proximal end portion configured to engage a sealant material dispensing system,
   a body portion connected to the proximal end portion,
   a distal end portion connected to the body portion, a continuous channel being defined through the proximal end portion, body portion, and distal end portion to an aperture provided in the distal end portion for dispensing the sealant material into an opening of the cavity, the aperture being smaller than the opening to the cavity, and a compressible material surrounding the aperture, wherein the distal end portion has an end face surrounding the aperture, the end face having a linear ridge formed by intersecting planar surfaces, the ridge defining a line crossing the aperture asymmetrically, wherein the compressible material is adhered to the end face, the compressible material having an opening permitting flow of sealant out of the aperture of the distal end portion.

2. The sealant dispensing tip of claim 1, a sectional plane being defined to bisect an upper portion of the channel and to contain the linear ridge, the aperture being located at least mostly on one side of the sectional plane.

3. The sealant dispensing tip of claim 1, wherein the planar surfaces form an angle of 80 to 100 degrees.

4. The sealant dispensing tip of claim 1, wherein the sealant dispensing tip is configured to fill the cavity with sealant.

5. The sealant dispensing tip of claim 1, wherein the opening in the compressible material is smaller than the opening to the cavity and larger than the aperture in the distal end portion.

6. The sealant dispensing tip of claim 1, wherein the compressible material is configured to create a temporary seal around the channel between the distal end portion and a structure adjacent the opening of the cavity.

7. The sealant dispensing tip of claim 1, wherein the channel has a varying cross-sectional shape that is circular at the proximal end portion and elongate at the distal end portion.

8. The sealant dispensing tip of claim 1, wherein the aperture of the distal end portion is elongate.

9. The sealant dispensing tip of claim 1, wherein the compressible material has an indentation force deflection of at least about 25% under a compressive force of 5-9 psi (30-60 kPa).

10. A sealant injection system, comprising
    a robot having an end effector that is configured to move a sealant dispenser and to control a flow of sealant to a desired location,
    a nozzle connected to the end effector, and
    the sealant dispensing tip of claim 1 mounted on the nozzle.

11. The sealant injection system of claim 10, wherein the opening in the compressible member is elongate having a long axis and a short axis, the aperture being symmetrically located relative to the short axis and nonsymmetrically located relative to the long axis.

12. The sealant injection system of claim 10, wherein the opening in the compressible member is larger than the aperture in the end face.

13. The sealant injection system of claim 10, wherein the robot is configured to position the sealant dispensing tip against a surface, and to apply a force on the surface at the sealant dispensing tip of at least approximately 5 psi (30 kPa) prior to initiating the flow of sealant through the aperture in the end face.

14. The sealant injection system of claim 10, wherein the robot is configured to position the sealant dispensing tip against a surface, and to apply a force with the sealant dispensing tip against the surface sufficient to compress the compressible member by at least 25% of its uncompressed thickness.

15. The sealant injection system of claim 10, wherein the end face of the sealant dispensing tip has a linear ridge formed by intersecting planar faces.

16. The sealant injection system of claim 15, wherein the aperture is located mostly to one side of the ridge.

17. The sealant injection system of claim 15, wherein the aperture is isolated on one side of the ridge.

18. The sealant dispensing tip of claim 1, wherein the compressible material has an opening surrounding and centered on the aperture.

* * * * *